United States Patent Office 3,088,952
Patented May 7, 1963

3,088,952
1β-CYANO DERIVATIVES OF Δ⁴-3-KETO PREGNENES
Albert Bowers and Howard J. Ringold, Mexico City, Mexico, assignors, by mesne assignments, to Syntex Corporation, a corporation of Panama
No Drawing. Filed Feb. 5, 1960, Ser. No. 6,850
Claims priority, application Mexico Feb. 7, 1959
19 Claims. (Cl. 260—397.3)

The present invention relates to novel cyclopentanophenanthrene compounds and process of preparing same.

More particularly the invention relates to novel 1-cyano derivatives of Δ⁴-3-keto steroids of the pregnane series which may or may not be oxygenated at C–11 and which may or may not contain a 17α-hydroxy or 17α-acyloxy grouping.

The novel compounds of the present invention which are progestational agents having anti-estrogenic activity can be represented by the following formulae:

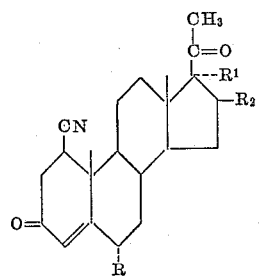 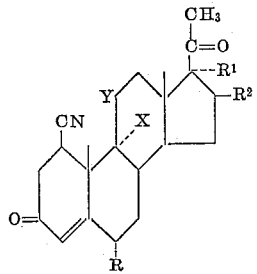

In the above formulae, R represents hydrogen, methyl or fluorine and R' represents hydrogen, hydroxy or hydrocarbon carboxylic acyloxy containing from 1 to 12 carbon atoms. Y represents keto or β-hydroxy. X represents hydrogen, or fluorine. $R^2$ represents hydrogen, α-methyl or β-methyl.

The novel compounds of the present invention which are active hormones having anti-estrogenic activity and anti-androgenic activity can be illustrated by the following formula:

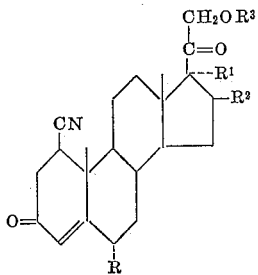

In the above formula, R and R' are the same groups as previously set forth. $R^3$ represents hydrogen of the acyl radical of a hydrocarbon carboxylic acid containing from 1 to 12 carbon atoms. $R^2$ represents hydrogen, α-methyl or β-methyl.

The novel compounds of the present invention which are active hormones having anti-inflammatory, glycogenic, thymolytic, eosinopenic, anti-estrogenic and anti-andro-genic activity may be illustrated by the following formula:

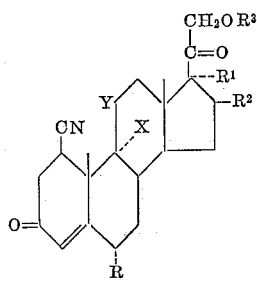

In the above formula, R,R',$R^2$,$R^3$,X and Y represent the same groups as heretofore set forth.

The acyl group which is derived from a hydrocarbon carboxylic acid containing from 1 to 12 carbon atoms may be saturated or unsaturated, straight chain or branched chair aliphatic, cyclic or mixed cyclic aliphatic and may be substituted as by hydroxy, acyloxy, containing 1 to 12 carbon atoms, alkoxy containing 1 to 5 carbon atoms or halogen such as fluorine, chlorine or bromine. Typical acyl groups of this type are the acetate, propionate, butyrate, hemisuccinate, enanthate, caproate, benzoate, trimethylacetate, phenoxyacetate, phenylpropionate, cyclopentylpropionate and β-chloropropionate.

The novel 1-cyano pregnene derivatives are prepared from the corresponding 1-dehydro pregnene compound. Since cyanization causes hydrolysis of ester groups, the hydroxy groups of the starting materials should be in the free form. Prior to the cyanization step the di-hydroxyacetone side chain of the cortical type hormones are protected as by formation of the 17,20;20,21-bis-methylenedioxy derivatives as disclosed by Sarett et al. in J.A.C.S. 80, 1517 (1958) while the 21-hydroxy of the desoxycorticosterone type compound is temporarily protected by formation of an ether, for example, the formation of the 21-(21-tetrahydropyranyl)-ether. The elements of hydrogen cyanide are added to the starting 1-dehydro-pregnene compounds by refluxing the latter compounds with an alkali metal cyanide such as potassium cyanide or the cyanide of an alkaline earth metal in an alcoholic solvent such as ethanol or methanol. The protective bis-methylenedioxy groups may then be removed by hydrolysis as by treatment with an aqueous organic acid, such as with formic acid. The 21-ether group of the desoxycorticosterone compound is regenerated to the 21-hydroxy group by treatment with dilute mineral acid.

The thus formed 1-cyano-pregnene compounds may then be esterified by conventional methods. Thus by conventional reaction with the corresponding acid anhydride or acyl chloride in pyridine solution at room temperature there is prepared the corresponding C–21 esters and by reaction with acid anhydride in the presence of an acid catalyst such as p-toluenesulfonic acid, there is prepared the corresponding C–17 esters.

This invention is further illustrated but not limited by the following examples:

*Example 1*

A mixture of 2 g. of 1-dehydro-progesterone, described by Sondheimer et al. in J.A.C.S. 77, p. 5673 (1955), 4 g. of potassium cyanide and 100 cc. of 95% ethanol was refluxed for 1 hour, cooled, diluted with water and the reaction mixture was extracted with ethyl acetate. The extract was washed with water, dried over anhydrous sodium sulfate and the solvent was evaporated. By chromatography of the residue on neutral alumina there was obtained 1-cyano-progesterone.

*Example 2*

In accordance with the method of Example 1, 17α-hydroxy-1-dehydro-progesterone, described by Rosenkranz et al. in J.A.C.S. 72, p. 4081 (1950), was converted into 1-cyano-17α-hydroxy-progesterone.

A mixture of 500 mg. of this compound, 2.5 cc. of acetic anhydride, 25 cc. of glacial acetic acid and 500 mg. of p-toluenesulfonic acid was kept overnight at room temperature, diluted with water and extracted with ethyl acetate; the extract was washed with 5% aqueous sodium bicarbonate solution and water, dried over anhydrous sodium sulfate and evaporated to dryness. After chromatography of the residue on neutral alumina the pure 1-cyano-17α-acetoxy-progesterone was obtained.

*Example 3*

By refluxing 2 g. of the 17,20;20,21-bis-methylenedioxy derivative of $\Delta^{1,4}$-pregnadiene-17α,21-diol-3,20-dione with potassium cyanide, exactly as described in Example 1, there was obtained the 17,20;20,21-bis-methylenedioxy derivative of 1-cyano-$\Delta^4$-pregnene-17α,21-diol-3,20-dione.

Upon subsequent reflux with 60% formic acid for 1 hour followed by dilution with water, filtration of the product and recrystallization from acetone, there was obtained 1-cyano-$\Delta^4$-pregnene-17α,21-diol-3,20-dione in the free form.

Its 21-propionate was then formed by the reaction with propionic anhydride in pyridine in a conventional manner; the hydroxyl group at C–17 was then acetylated by the method of Example 2 and thus there was obtained 1-cyano-$\Delta^4$-pregnene-17α,21-diol-3,20-dione 17-acetate-21-propionate.

The starting material 17,20;20,21-bis-methylenedioxy derivative of $\Delta^{1,4}$-pregnadiene-17α,21-diol-3,20-dione was obtained from $\Delta^{1,4}$-pregnadiene-17α,21-diol-3,20-dione described in U.S. Patent 2,579,479 by the method described in U.S. Patent 2,866,799.

*Example 4*

By following the procedure described in Example 3, the 17,20;20,21-bis-methylenedioxy derivative of 16α-methyl-9α-fluoro-prednisolone was converted into that of 1-cyano-16α-methyl-9α-fluoro-hydrocortisone; the bis methylenedioxy group was then hydrolyzed and the hydroxyl group at C–21 was finally acetylated by treatment with acetic anhydride in pyridine. There was thus obtained 1-cyano-16α-methyl-9α-fluoro-hydrocortisone 21-acetate.

The starting material is obtained from the known 16α-methyl-9α-fluoro-prednisolone by the method disclosed in U.S. Patent 2,866,799. Similarly, 6α-methyl-9α-fluoro-prednisolone described by Spero et al. in J.A.C.S. 79, 1515 (1957) was converted into 1-cyano-6α-methyl-9α-fluoro-hydrocortisone 21-acetate.

*Example 5*

In accordance with the method of the previous example from the 17,20;20,21-bis-methylenedioxy derivative of 6α-methyl-prednisolone prepared from 6α-methyl-prednisolone by the method disclosed in U.S. Patent 2,866,799 there were finally obtained 1-cyano-6α-methyl-hydrocortisone and the 21-acetate thereof.

*Example 6*

In accordance with the method of Example 3, from the 17,20;20,21-bis-methylenedioxy derivative of 6α-fluoro-prednisolone there were finally obtained 1-cyano-6α-fluoro-hydrocortisone and the 21-acetate thereof.

The starting material is obtained from 6α-fluoro-prednisolone, described by Bowers et al. in J.A.C.S. 80, p. 4423 (1958), by the method disclosed in U.S. Patent 2,866,799.

*Example 7*

To a solution of 3 g. of $\Delta^{1,4}$-pregnadien-21-ol-3,20-dione described by R. L. Clarke et al. in J.A.C.S. 77, p. 661 (1955), in 60 cc. of dry benzene there was added 6 cc. of 2,3-dihydropyrane and 120 mg. of p-toluenesulfonic acid and the mixture was kept for 20 hours at room temperature; it was then diluted with 5% aqueous sodium bicarbonate solution and the organic layer was separated, washed with water, dried over anhydrous sodium sulfate and the benzene was evaporated. The residue consisted of the 21-(2'-tetrahydropyranyl)-ether of 1-dehydro-desoxycorticosterone.

By following the procedure described in Example 1, on refluxing with potassium cyanide there was then obtained the 21-(2'-tetrahydropyranyl)-ether of 1-cyano-desoxycorticosterone. A solution of the latter compound in 100 cc. of methanol was treated with 2 cc. of concentrated hydrochloric acid and kept overnight at room temperature, diluted with 5% aqueous sodium bicarbonate solution and extracted with several portions of ether; the extract was washed with water, dried over anhydrous sodium sulfate and evaporated to dryness. By chromatography of the residue on neutral alumina there was obtained 1-cyano-desoxycorticosterone. Upon subsequent acetylation, in accordance with the method described in Example 2, there was obtained 1-cyano-desoxycorticosterone 21-acetate.

*Example 8*

In accordance with the method of Example 1 the 17,20;20,21-bis-methylenedioxy derivative of prednisone was converted into that of 1-cyano-cortisone, the bis-methylenedioxy group was then hydrolyzed and the hydroxyl group at C–21 was esterified in a conventional manner with caproic anhydride in pyridine. There was thus obtained 1-cyano-cortisone 21-caproate.

*Example 9*

By following the method of the previous example with the 17,20;20,21-bis-methylenedioxy derivative of prednisolone as starting material and using cyclopentyl propionic anhydride as esterifying agent, there was finally obtained the 21-cyclopentyl propionate of 1-cyano-hydrocortisone.

*Example 10*

In accordance with the method of Example 1, 6α-methyl-1-dehydro-17α-acetoxy progesterone that was disclosed in our copending patent application Serial No. 744,347, filed on June 25, 1958, was converted into 1-cyano-6α-methyl-17α-acetoxy-progesterone.

*Example 11*

By following the procedure of Example 3, 1 g. of 6α-fluoro-$\Delta^{1,4}$-pregnadien-17α,21-diol-3,20-dione, described by Bowers et al. in J.A.C.S. 80, p. 4423 (1958), was converted into the corresponding 17,20;20,21-bis-methylenedioxy derivative, and then treated with potassium cyanide followed by subsequent reflux with 60% formic acid, as described in the same example, yielding finally 1-cyano-6α-fluoro-$\Delta^4$-pregnen-17α,21-diol-3,20-dione.

Example *12*

In accordance with the method of Example 1, 1-dehydro-6α-fluoro-progesterone, described in our co-pending patent application Serial No. 753,629, filed in August 7, 1958, was converted into 1-cyano-6α-fluoro-progesterone.

In accordance with the method of preparation described in the previous example, the compounds listed below under I were dehydrogenated with selenium dioxide to the corresponding 1-dehydro derivatives, which in turn by treatment with potassium cyanide in alcohol, by the method described in Example 1, afforded the 1-cyano compounds, listed under II.

| Example | I | II |
|---|---|---|
| 13 | 6α,fluoro-11-keto-progesterone. | 1-cyano-6α-fluoro-11-keto-progesterone. |
| 14 | 6α-fluoro-11β-hydroxy-progesterone, U.S. Patent 2,838,501. | 1-cyano-6α-fluoro-11β-hydroxy-progesterone, U.S. Patent 2,838,501. |
| 15 | 11-keto-progesterone, O. Mancera et al., J. Org. Chem. 17, 1066, (1952). | 1-cyano-11-keto-progesterone. |
| 16 | 9α-fluoro-11β-hydroxy-progesterone, Freid et al., J.A.C.S. 77, 1068 (1955). | 1-cyano-9α-fluoro-11β-hydroxy-progesterone, Fried et al., J.A.C.S. 77, 1068 (1955). |

*Example 17*

In accordance with the method of Example 1, the 17,20;20,21-bis-methylenedioxy derivative of 6α-methyl-Δ¹,⁴-pregnadiene-17α,21-diol-3,20-dione was converted into the corresponding 1-cyano derivative. Upon subsequent reflux with 60% formic acid by the method of Example 3, followed by recrystallization from methylene chloride ether there was obtained 1-cyano-6α-methyl-Δ⁴-pregnen-17α,21-diol-3,20-dione i.e. 1-cyano-6α-methyl compound "S." Acetylation at C–21 by treatment with acetic anhydride in pyridine, in a conventional manner gave 1-cyano-6α-methyl-Δ⁴-pregnene - 17α,21-diol-3,20-dione-21-monoacetate.

The starting material was obtained from 6α-methyl-Δ¹,⁴-pregnadiene-17α,21-diol-3,20-dione, disclosed in our co-pending patent application Serial No. 709,795, filed on January 20, 1958, by the method described in U.S. Patent 2,866,799.

In accordance with the methods set forth in the previous examples, 16-methyl-1-dehydro-progesterone (prepared from the known 16-methyl-pregnenolone by conventional Oppenauer oxidation and then followed by dehydrogenation with selenium dioxide) was converted into 1-cyano-16-methyl progesterone; 6α,16β - dimethyl - 17α-hydroxy-1-dehydro-progesterone (disclosed in co-pending application Serial No. 796,764 filed on March 3, 1959), 6α-fluoro-16β-methyl - 17α-hydroxy-1-dehydro-progesterone (disclosed in co-pending application Serial No. 792,-964, filed on February 13, 1959) were converted into 1-cyano-6α,16β-dimethyl - 17α-hydroxy-progesterone and 1-cyano-6α-fluoro-16β-methyl - 17α-hydroxy-progesterone respectively. Upon conventional esterification, as with acetic anhydride, there were obtained the corresponding 17α-acetates. Similarly from 16α-methyl-9α-fluoro-11β-hydroxy-1-dehydro-progesterone (disclosed in co-pending application Serial No. 860,734, filed on December 21, 1959) as well as from the known 16α-methyl-prednisolone, 16β-methyl - 9α - fluoro - prednisolone, 16α-methyl-prednisone, 16β - methyl - prednisone and 16α - methyl-1-dehydro-Compound S there were obtained the corresponding 1-cyano-derivatives, i.e. 1-cyano-16α-methyl-9α-fluoro - 11β - hydroxy - progesterone, also 1-cyano - 16α-methyl-hydrocortisone; 1-cyano-9α-fluoro - 16β - methyl-hydrocortisone; 1-cyano-16α-methyl - cortisone; 1-cyano-16β-methyl-cortisone; 1-cyano-16α-methyl - Compound S as well as the 21-monoesters and 17α,21-diesters of the foregoing, particularly the esters derived from the hydrocarbon carboxylic acids set forth previously.

We claim:

1. A compound of the formula:

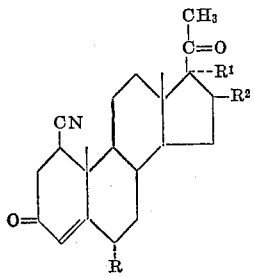

wherein R is selected from the group consisting of hydrogen, methyl and fluorine; R' is selected from the group consisting of hydrogen, hydroxy and acyloxy in which the acyl group is that of a hydrocarbon carboxylic acid of less than 12 carbon atoms; R² is selected from the group consisting of hydrogen, α-methyl and β-methyl.

2. 1β-cyano-progesterone.

3. The hydrocarbon carboxylic acid ester of less than 12 carbon atoms of 1β-cyano-17α-hydroxy-progesterone.

4. 1β-cyano-17α-acetoxy-progesterone.

5. 1β-cyano-6α-fluoro - 16β - dimethyl - 17α - acetoxy-progesterone.

6. 1β-cyano-6α-methyl-17α-acetoxy-progesterone.

7. A compound of the following formula:

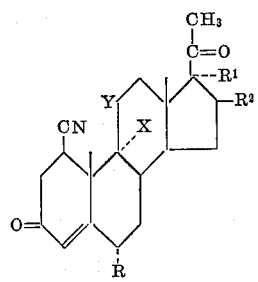

wherein R is selected from the group consisting of hydrogen, methyl and fluorine; R' is selected from the group consisting of hydrogen, hydroxy and acyloxy in which the acyl group is that of a hydrocarbon carboxylic acid of less than 12 carbon atoms; R² is selected from the group consisting of hydrogen, α-methyl and β-methyl; Y is selected from the group consisting of keto and β-hydroxy; X is selected from the group consisting of hydrogen and fluorine.

8. A compound of the following formula:

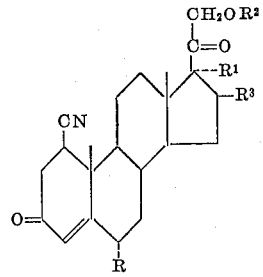

wherein R is selected from the group consisting of hydrogen, methyl and fluorine; R' is selected from the group consisting of hydrogen, hydroxy and acyloxy in which the acyl group is that of a hydrocarbon carboxylic acid of less than 12 carbon atoms; R² is selected from the group consisting of hydrogen and a hydrocarbon carboxylic acyl group of less than 12 carbon atoms; R³ is selected from the group consisting of hydrogen, α-methyl and β-methyl.

9. The hydrocarbon carboxylic acid esters of less than 12 carbon atoms of 1β-cyano-Δ⁴-pregnene-17α,21-diol-3,20-dione.

10. 1β-cyano-Δ⁴-pregnene-21-ol-3,20-dione acetate.

11. A compound of the following formula:

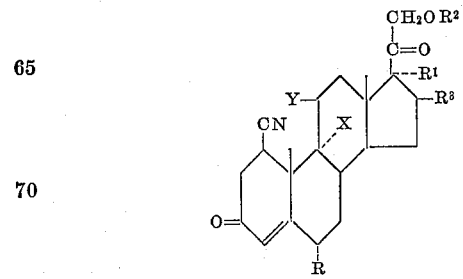

wherein R is selected from the group consisting of hydrogen, methyl and fluorine; R' is selected from the group consisting of hydrogen, hydroxy and acyloxy in which the acyl group is that of a hydrocarbon carboxylic acid of less than 12 carbon atoms; $R^2$ is selected from the group consisting of hydrogen and a hydrocarbon carboxylic acyl group of less than 12 carbon atoms; $R^3$ is selected from the group consisting of hydrogen, α-methyl and β-methyl; Y is selected from the group consisting of keto and β-hydroxy; X is selected from the group consisting of hydrogen and fluorine.

12. 1β-cyano-cortisone.
13. 1β-cyano-6α-fluoro-hydrocortisone.
14. 1β-cyano-9α-fluoro-16α-methyl-hydrocortisone.
15. The hydrocarbon carboxylic acid esters of less than 12 carbon atoms of 1β-cyano-cortisone.
16. The hydrocarbon carboxylic acid ester of less than 12 carbon atoms of 1β-cyano-hydrocortisone.
17. 1β-cyano-6α-methyl-hydrocortisone-21-acetate.
18. 1β-cyano-6α-methyl-9α-fluoro-hydrocortisone-21-acetate.
19. 1β-cyano-6α-fluoro-hydrocortisone-21-acetate.

No references cited.